(12) United States Patent
Sloth et al.

(10) Patent No.: US 12,286,956 B2
(45) Date of Patent: Apr. 29, 2025

(54) MODULAR WIND TURBINE BLADE WITH VIBRATION DAMPING

(71) Applicant: VESTAS WIND SYSTEMS A/S, Aarhus N. (DK)

(72) Inventors: Erik Sloth, Rønde (DK); Brian Jørgensen, Galten (DK); Simon Stevns Kazar, Egå (DK); Anders Yde Wollesen, Aarhus (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/787,917

(22) PCT Filed: Dec. 18, 2020

(86) PCT No.: PCT/DK2020/050387
§ 371 (c)(1),
(2) Date: Jun. 21, 2022

(87) PCT Pub. No.: WO2021/129913
PCT Pub. Date: Jul. 1, 2021

(65) Prior Publication Data
US 2023/0020641 A1    Jan. 19, 2023

(30) Foreign Application Priority Data
Dec. 23, 2019  (DK) .................................. 2019 01547

(51) Int. Cl.
*F03D 1/06* (2006.01)
(52) U.S. Cl.
CPC ...... *F03D 1/0677* (2023.08); *F05B 2240/302* (2013.01); *F05B 2260/964* (2013.01); *F16C 2360/31* (2013.01); *Y02E 10/72* (2013.01)

(58) Field of Classification Search
CPC .... F03D 1/0675; F03D 1/0633; F03D 1/0677; F03D 1/0641; F03D 1/0642;
(Continued)

(56) References Cited

U.S. PATENT DOCUMENTS 4,295,790 A * 10/1981 Eggert, Jr. ............ F03D 1/0675
416/226
5,678,840 A * 10/1997 Simonian ............... A63C 5/075
267/141
(Continued)

FOREIGN PATENT DOCUMENTS

CN     103452747 A    12/2013
CN     105804944 A    7/2016
(Continued)

OTHER PUBLICATIONS

JP-S62192183-A, English Langauge Machine Translation (Year: 1987).*
(Continued)

*Primary Examiner* — Wesley G Harris
(74) *Attorney, Agent, or Firm* — Patterson + Sheridan, LLP

(57) ABSTRACT

According to a first aspect of the invention, there is provided a wind turbine blade having a split blade configuration, comprising a first blade module defining an aerofoil profile and a second blade module defining an aerofoil profile; a damping module intermediate the first blade module and the second blade module; wherein the damping module comprises a first blade interface for joining to the first blade module and a second blade interface for joining to the second blade module. The damping module comprises a vibration damping unit.

(Continued)

Beneficially, the invention provides a useful way in which to integrate motion damping functionality into a modular wind turbine blade.

18 Claims, 7 Drawing Sheets

(58) Field of Classification Search
CPC .. F03D 1/06495; F03D 7/0296; F03D 7/0298; F05B 2240/302; F05B 2260/964; F05B 2240/305; F05B 2240/3052; F05B 2240/3062; F16C 2360/31; Y02E 10/72
See application file for complete search history.

(56) References Cited

U.S. PATENT DOCUMENTS

| | | | |
|---|---|---|---|
| 6,672,837 B1 | 1/2004 | Veldkamp et al. | |
| 10,273,934 B2 * | 4/2019 | Jensen | B23P 6/002 |
| 2010/0239426 A1 * | 9/2010 | Westergaard | F03D 80/00 416/226 |
| 2010/0310379 A1 * | 12/2010 | Livingston | F03D 1/0675 29/889.71 |
| 2011/0182730 A1 | 7/2011 | Link | |
| 2013/0219718 A1 | 8/2013 | Busbey et al. | |
| 2013/0280064 A1 * | 10/2013 | van Steinvoren | F03D 13/35 416/1 |
| 2019/0338750 A1 * | 11/2019 | Bech | F03D 1/0675 |

FOREIGN PATENT DOCUMENTS

| | | | | |
|---|---|---|---|---|
| CN | 109906294 A | | 6/2019 | |
| EP | 1485611 A1 | | 12/2004 | |
| EP | 1584817 A1 | * | 10/2005 | ........... F03D 1/0675 |
| EP | 2409029 A2 | | 1/2012 | |
| EP | 2634418 A2 | * | 9/2013 | ............. F03D 1/065 |
| GB | 2098671 A | * | 11/1982 | ........... F03D 1/0641 |
| JP | S62192183 A | * | 8/1987 | ............. A63B 49/00 |
| WO | WO-9521327 A1 | * | 8/1995 | ........... B64C 27/001 |
| WO | WO-9963219 A1 | * | 12/1999 | ............. F03D 80/00 |
| WO | 2012019612 A2 | | 2/2012 | |
| WO | WO-2016006008 A1 | * | 1/2016 | ........... F03D 1/0675 |
| WO | WO-2019219139 A1 | * | 11/2019 | ........... F03D 1/0675 |
| WO | 2021129913 A1 | | 7/2021 | |

OTHER PUBLICATIONS

Danish Patent and Trademark Office, 1st Technical Examination Including The Search Report for Application PA 2019 01547 dated Jun. 16, 2020.
PCT, International Search Report for Application PCT/DK2020/050387 dated Mar. 16, 2021.
PCT, Written Opinion of The International Searching Authority for Application PCT/DK2020/050387 dated Mar. 16, 2021.
China Patent Office, First Office Action for Chinese Patent Application No. 202080091802.1, dated May 8, 2024.
Second Office Action received for Chinese Patent Application No. 202080091802.1, mailed on Nov. 27, 2024, 9 pages (5 pages of English Translation and 4 pages of Original Document).
Office Action received for European Patent Application No. 20828652.6, mailed on Feb. 6, 2025, 4 pages.

* cited by examiner

MODULAR WIND TURBINE BLADE WITH VIBRATION DAMPING

FIELD OF THE INVENTION

The invention relates generally to a modular wind turbine blade and, more specifically, to a type of modular wind turbine blade which is better able to withstand edgewise vibrations.

BACKGROUND

In order to take advantage of economies of scale in wind energy, there is a general drive to make wind turbines larger in order to reduce the overall cost of energy. Larger wind turbines have longer wind turbines blades which provide a larger swept area so that the wind turbine can capture more energy from the wind.

One issue associated with long wind turbine blades is the challenge of how to transport them effectively to the installation site. Long wind turbine blades are problematic to transport on land due to the constraints imposed by road networks.

To address these issues, it is known to design wind turbine blades as a modular assembly. As such, a wind turbine blade may be divided into two or more modules that are easier to transport and which are then assembled on site, for example by adhesively bonding or bolting the modules together.

Despite their modularity, modular wind turbine blades tend to be slender items that are susceptible to vibrations. Of particular concern are edgewise vibrational modes because slender blades tend to exhibit less inherent aerodynamic damping in the edgewise direction in comparison to the flapwise direction, where lift forces generated by the blades tend to attenuate flapwise oscillations.

It is against this background that the present invention has been developed.

SUMMARY OF THE INVENTION

According to a first aspect of the invention, there is provided a wind turbine blade having a split blade configuration, comprising a first blade module defining an aerofoil profile and a second blade module defining an aerofoil profile; a damping module intermediate the first blade module and the second blade module; wherein the damping module comprises a first blade interface for joining to the first blade module and a second blade interface for joining to the second blade module. The damping module comprises a vibration damping unit.

Beneficially, the invention provides a useful way in which to integrate motion damping functionality into a modular wind turbine blade. Preferably the vibration damping unit is configured to attenuate edgewise vibrations of the wind turbine blade. The vibration damping unit may comprise various configurations and may include selected one or more of damping devices, including viscous dampers, spring devices including resiliently mounted masses, tuned mass dampers; fluid filled volumes and so on. Preferably the vibration damping unit is configured to act on a shear centre of the blade section where the damping module is located.

The damping module may be shaped to define an aerofoil profile. In this way, the damping module may integrate more effectively into the overall shape of the blade. In this context, the aerofoil profile of the damping module at the first blade interface may correspond to the aerofoil profile of the first blade module. Moreover, the aerofoil profile of the damping module at the first blade interface may match the adjoining aerofoil profile of the first blade module. So, the damping module may have a profile at each interface that matches the adjoining part of the relevant blade module. In contrast, the interfaces of the blade module may correspond to the respective adjoining faces of the blade modules, but may be a different size such that the aerofoil profile of the damping module has a larger cross-sectional area than the cross-sectional area of the first blade module and/or the second blade module.

The vibration damping unit may be configured to act so that it applies a force to the damping module, and therefore also to the first and second blade modules. The force is applied to a shear centre of the section of the wind turbine blade where the vibration damping unit is located. This minimises torsional forces applied to the wind turbine blade by the damping module.

Although the vibration damping unit may be housed internal to a body of the damping module, in other embodiments the vibration damping unit may be supported external to a body of the damping module.

At least one of the first interface and the second interface may be connected to a connection face of the respective first blade module and second blade module by a bolted connection. In other embodiments, the respective connection face is defined by a scarf joint. The connection may be a bonded connection or a bolted connection.

The vibration damping unit acts generally in a chordwise direction. This means that any movement of the vibration damping unit or parts of the vibration damping unit move in a substantially chordwise direction.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

BRIEF DESCRIPTION OF THE DRAWINGS

The above and other aspects of the invention will now be described, by way of example only, with reference to the accompanying drawings, in which.

In the drawings, the same reference numerals are used to denote features that are common across drawings.

SPECIFIC DESCRIPTION

Figure 1:
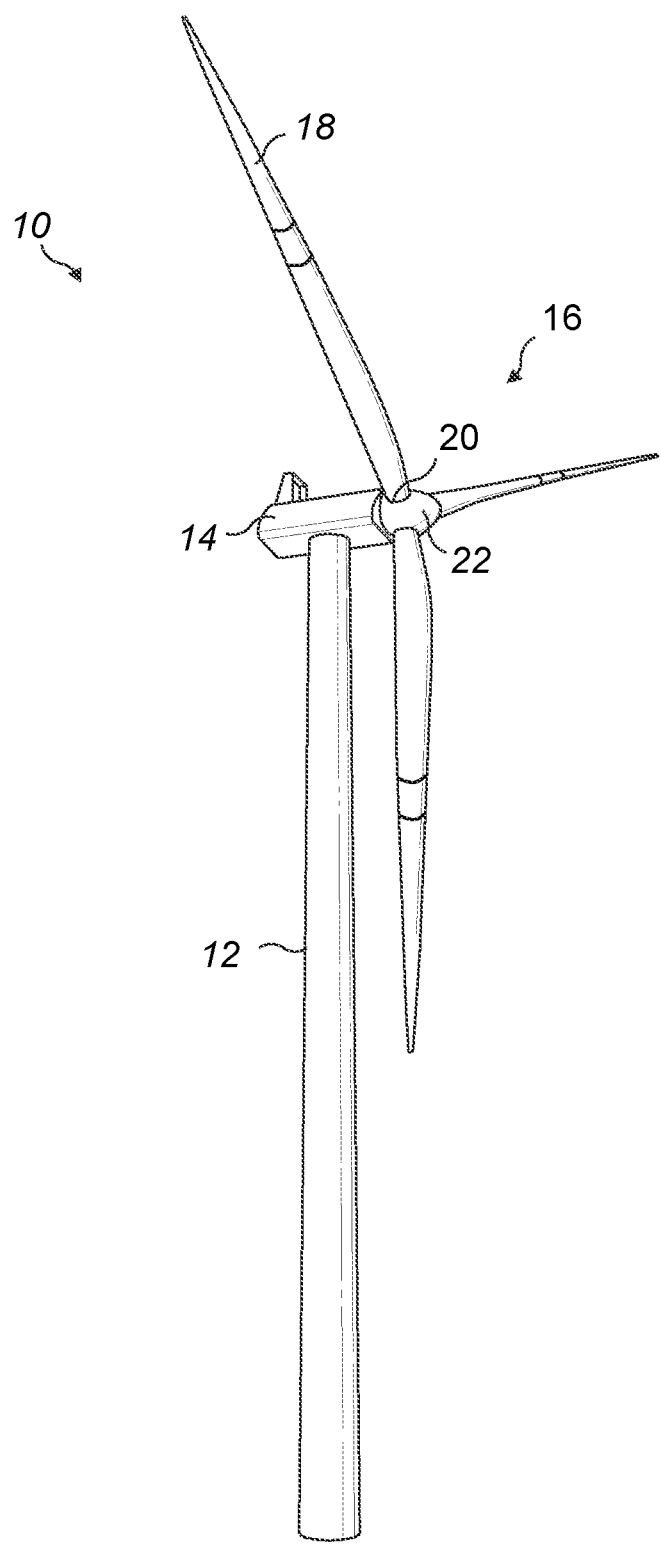
FIG. 1 is a perspective view of a wind turbine having wind turbine blades in which embodiments of the invention may be incorporated.

FIG. 1 is a schematic representation of a modern utility-scale wind turbine 10 which comprises a tower 12 supporting a nacelle 14. A rotor 16 is mounted to the nacelle 14. The rotor 16 comprises a plurality of radially extending wind turbine blades 18 which are attached at their respective root ends 20 to a central hub 22. In this example, the rotor 16 comprises three blades 18, but the rotor 16 may have any number of blades 18. The wind turbine blades 18 are of a type that is sometimes known as a 'split' or 'modular' blade design. As such, in this example the wind turbine blades 18 comprise first and second blade modules, though more than two modules per blade 18 may be used in other embodiments. As explained by way of background, the modular blade components may be assembled at the wind farm site to facilitate easier transportation of large components.

Figure 2:
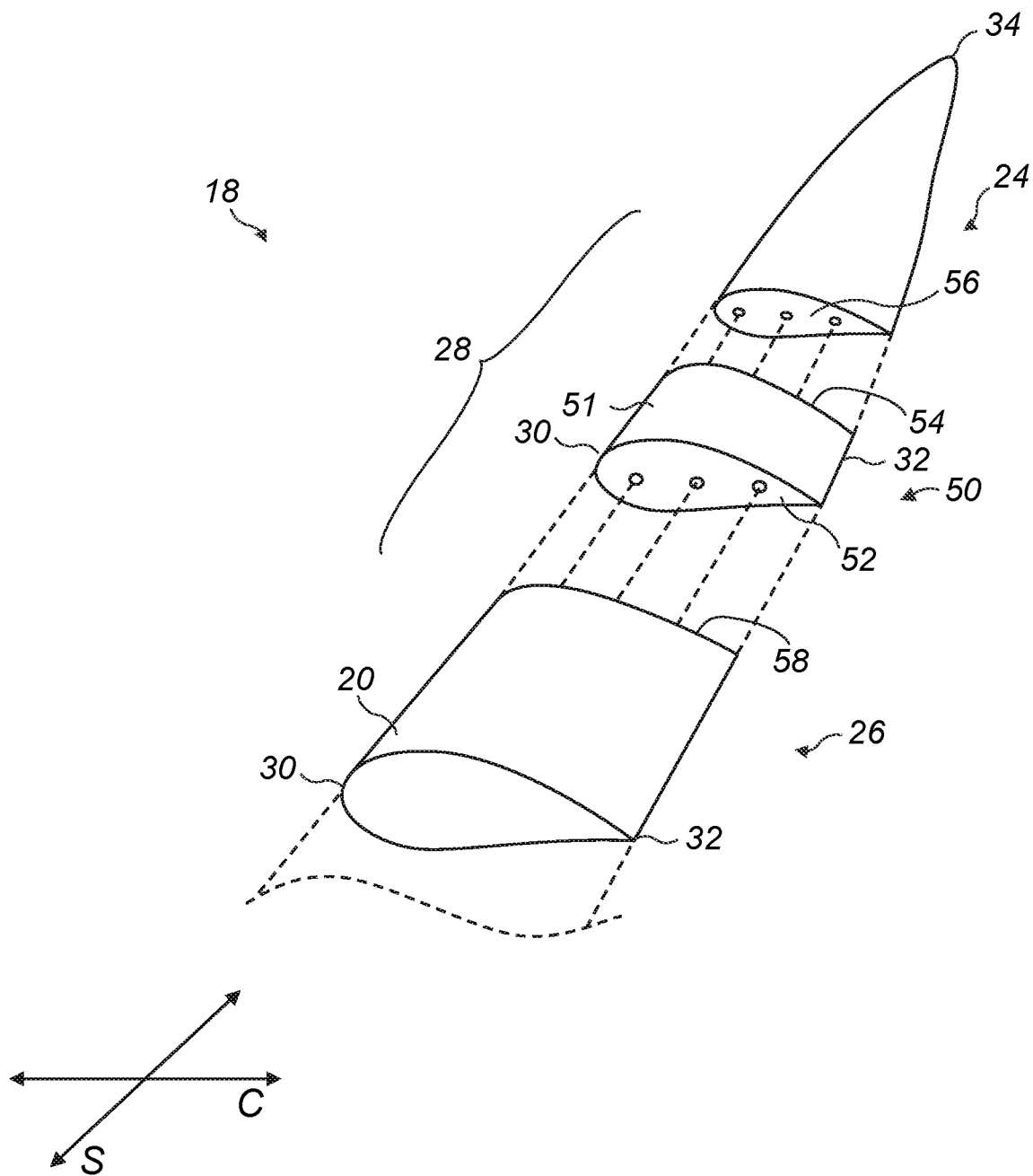
FIG. 2 is an exploded perspective view of a modular wind turbine blade in accordance with one embodiment of the invention, which includes a damping module.

Referring to FIG. 2, this shows a schematic exploded view of a modular wind turbine blade 18 according to a first embodiment of the present invention. The modular wind turbine blade 18 comprises first and second blade modules 24, 26. The blade modules 24, 26 are configured to be joined end-to-end in a joint region 28 to form the complete wind turbine blade 18.

In FIG. 2, the axes S and C indicate spanwise and chordwise directions respectively of the wind turbine blade 18 and also of each module of the blade 18. The first and second blade modules 24, 26 form spanwise (S) sections of the modular wind turbine blade 18. Each module extends in the chordwise direction between a leading edge 30 and a trailing edge 32 and defines an aerofoil profile.

In the embodiment shown, the first blade module 24 includes a tip 34 of the blade 18 and the second blade module 26 includes a root end 20 of the blade, although in FIG. 2 the root end of the blade is depicted as ghosted for the purposes of scale. In other embodiments, the first module 24 may comprise a root 20 of the blade and the second module 26 may comprise a tip 34 of the blade. Further, in other embodiments the modular blade 18 may include more than two modules, for example additional modules may be connected inboard or outboard of the first and/or second blade module 24, 26 and these further modules may include the blade root 20 and/or the blade tip 34.

Figure 3:
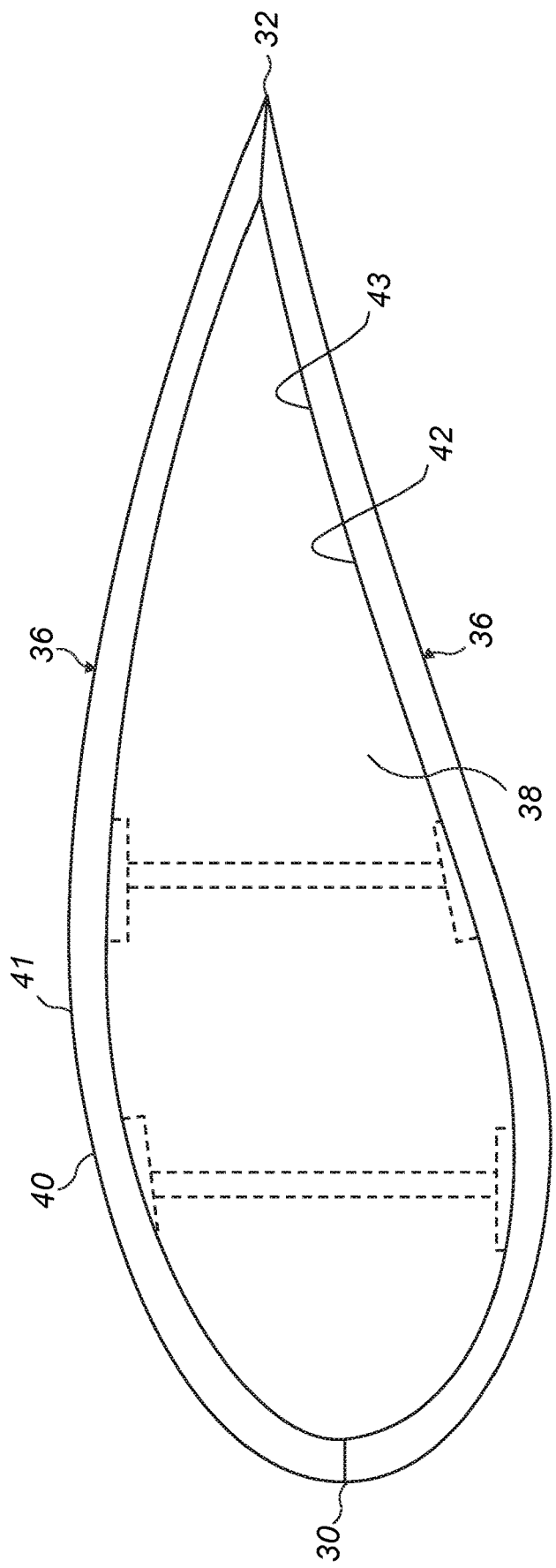
FIG. 3 is an exemplary cross section through a wind turbine blade by way of example, to illustrate structural components.

The general construction of the blade modules 24, 26 would be known to the skilled person. FIG. 3 shows a cross section view of a typical construction of a wind turbine blade for context. The features of the wind turbine blade will be referred to in the singular, but it will be appreciated that those features will apply equally to the various modules of the modular blade, as will be described. As such, the cross-section diagram of a blade module in FIG. 3 comprises an outer shell 36 defining a generally hollow interior 38. In this example, the outer shell 36 is formed primarily from glass-fibre-reinforced plastic (GFRP). The outer shell 36 has a laminate structure comprising an outer skin 40 defining an outer surface 41 of the blade 18 and an optional inner skin 42 defining an interior surface 43 of the blade 18. The outer and inner skins 40, 42 each comprise one or more layers of fibrous material (not shown) embedded in a cured matrix material, such as epoxy resin. Lightweight core material, such as foam panels may be provided between the skins 40,42 in regions of the blade shells 36 where increased stiffness is required.

Although not shown here, the skilled person would appreciate that the blade 18 would also include a spar structure, which typically may be embodied as a box-like spar extending lengthwise along the blade, or by means of spar caps embedded in the shells, those spar caps being connected by shear webs. However, structural detail regarding the spar scheme for the blade is not essential to the invention and so further discussion will be omitted for the sake of clarity, although an example of such a shear web structure is shown in ghosted form in FIG. 3.

In known modular blade designs the first blade module 24 would be connected directly to the second blade module 26 in an end-to-end manner. This may be achieved by a bolted butt-joint between the blade modules or by way of a bonded scarf joint. However, and as is apparent from FIG. 2, the modular wind turbine blade 18 includes a further module 50 intermediate or between the first blade module 24 and the second blade module 26. As will become apparent from the discussion that follows, the further module 50 is a damping module, and will be referred to as such from now on. The damping module 50 is configured to apply forces between the leading edge 30 and the trailing edge 32 of the wind turbine blade 18 during use to attenuate edgewise oscillations.

Referring initially to FIG. 2, it will be appreciated that the damping module 50 resembles a relatively short spanwise section of the wind turbine blade 18 and so has an aerodynamic body section 51 with a profile like that of the rest of the wind turbine blade. In this way, when the first blade module 24, the second blade module 26 and the damping module 50 are joined together, they form a completed wind turbine blade which appears from an exterior viewpoint to be a conventional wind turbine blade made as a single large article, with minimal join lines.

The damping module 50 has an aerofoil profile defined by its outer skin that extends between leading and trailing edges. The damping module 50 also includes transverse sides which define a respective first interface 52 and a second interface 54. The first interface 52 is on the spanwise outer side of the damping module 52, and the second interface 54 is on the spanwise inner side of the damping module 50. In this context, 'spanwise' is considered in the indicated reference frame for the blade, with references to 'inner' meaning towards the root of the blade contrasting with 'outer' meaning towards the tip of the blade.

The first interface 52 joins to a respective connection interface 56 of the first blade module 24, and the second interface 54 joins to a respective connection interface 58 of the second blade module 26.

The first and second interfaces 56,58 of the damping module 50 are shown here as being planar in form and extending in the chordwise direction of the wind turbine blade and as such can be considered to be perpendicular to the spanwise axis. Expressed another way, the interfaces 56, 58 are in the form of lateral walls or bulkheads that define connection surfaces that extend in a chordwise direction and substantially perpendicular to the spanwise axis. Precise perpendicularity is not essential, but it is one way to achieve an accurate butt joint between two adjoining sections of blade. In other embodiments, the interfaces may extend at an angle to the chordwise axis of the blade, for example around +/−30 degrees.

In this embodiment, the first interface 56 of the damping module 50 has a cross sectional shape that corresponds to the cross-sectional shape of the adjoining part (that is, the first connection interface 56) of the first blade module 24. Similarly, the second interface 54 of the damping module 50 has a cross sectional shape that corresponds to the adjoining part of the second blade module. As can be seen that cross-sectional shape is the notable generally teardrop shape of an aerofoil cross section. More specifically, in this embodiment the shapes, or profiles, of the first and second interfaces 52,54 of the damping module 50 match the respective shape of the adjoining blade module such that the blade modules 22,24 and the damping module 50 fit together without forming any significant surface irregularities or discontinuities that would affect airflow and thus reduce the aerodynamic efficiency of the blade. As discussed in later embodiments, however, the cross-sectional matching is not essential.

As has been mentioned, the damping module 50 is configured to damp edgewise vibrations of the wind turbine blade 18 in which it is incorporated. To this end therefore, the damping module 50 includes a vibration damping unit, which is illustrated generally in FIG. 4 by the reference number 60. Beneficially, the vibration damping unit 60 is configured so that it can be tuned in order to focus on attenuating vibrations at a particular frequency of edgewise vibrations.

Figure 4:
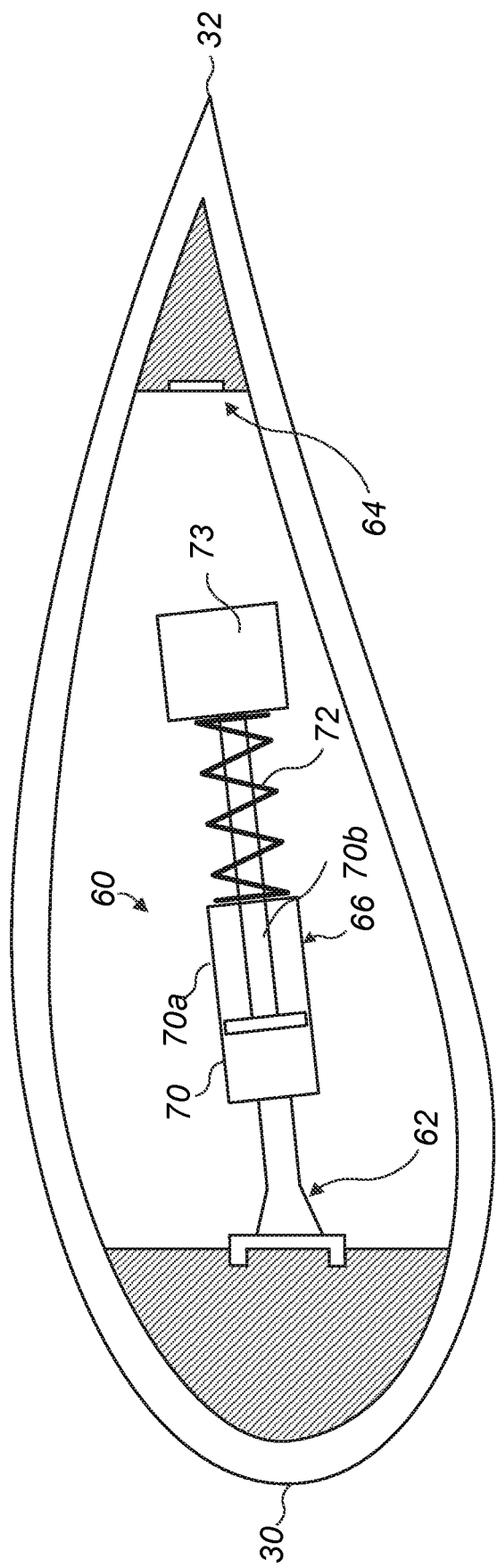
FIG. 4 is a schematic view of a damping module as shown in FIG. 2, in accordance with an embodiment of the invention.

In FIG. 4, the exemplary vibration damping unit 60 is housed within the damping module 50. Here, the vibration damping unit 60 is positioned between the leading edge 30 and the trailing edge 32 of the damping module 50. However, as illustrated, the vibration damping unit 60 is shown as connected to the leading edge 60. It may alternatively be connected to the trailing edge 32. For this purpose the leading and trailing edges 30,32 may be configured with respective mounting brackets 62,64 on which the vibration damping unit 60 may be mounted.

During edgewise vibrations of the blade, the leading edge 30 and the trailing edge 32 move generally in synchronisation with one another as the blade oscillates generally in the chordwise direction. Since the vibration damping unit 60 is connected to the damping module 50, it provides a counter force to movement which reduces the extent of the edgewise vibrations.

The vibration damping unit may in general be any item that is able to resonate due to motion of the damping module 50. It may be a tuned mass damper or a mass/rubber item connected resiliently inside the damping module 50. In one embodiment, the vibration damping unit may be a mass that is mounted on a spring inside the damping module 50, the mass and spring being selected to act most effectively at attenuating vibrations of a predetermined frequency. In other embodiments, the vibration damping device may include a viscous damper that is connected inside the damping module 50, which may, in some embodiments, be configured to apply a force through a shear centre of the blade section.

As shown in FIG. 4, the vibration damping unit 60 may be a mass-spring-damper device 66. As such, the spring-damper device 66 may comprise a hydraulic damper 70 combined with a spring 72 and a connected mass 73. The mass-spring-damper device 66 may be configured much like a coil-over shock absorber used in automotive applications, and as would be well understood by the skilled person. As such, the damper 70 includes a barrel 70*a* and a slidable piston rod 70*b*. Other spring-damper units would be acceptable. Note that in wind turbine blade modules featuring a structural spar in the centre of the hollow interior, it is envisaged that device 66 could be connected from respective leading or trailing edges to a side of the structural spar.

As discussed, the spring-damper device 66 may be tuneable. This tuning may be configured during manufacture in order to specify the most appropriate damping coefficient and spring constant of the spring-damper device 66 in order to achieve the desired attenuation of edgewise vibration. Another option is that the spring-damper device 66 is provided with adjustability. For example, the hydraulic damper 70 could have the required adjustability by way of a hydraulic piston with variable flow orifice area so as to vary the damping coefficient. Furthermore, the spring 72 could be provided with an adjustable spring constant. The mass 73 could also be configured to provide the required oscillatory characteristics.

In order to minimise torsional effects on the blade, it s preferable that the vibration damping unit acts generally in the chordwise direction but through a shear centre of the blade section where the vibration damping unit is located. As the skilled person knows, the shear centre is a point on a blade section where an applied load will cause bending of the blade without any twist. If the vibration damping unit acts on the shear centre of a blade section it should not generate any torsional moments on the blade which could otherwise influence the blade aerodynamics.

Beneficially, the damping module 50 provides a convenient way of integrating a means to damp edgewise vibration into a modular blade. Known approaches of equipping blades with vibration dampers require the damping mechanisms to be incorporated into the wind turbine blade during manufacture. Therefore, the embodiments of the invention enable such functionality to be provided to modular blades after manufacturing of the blade modules have been completed. Further, since the damping module is a separate component to the blade modules, maintenance can be carried out on the damping module in a very convenient way. For example, the damping module could be disassembled out of the modular wind turbine blade in order to be inspected or fixed if a fault occurs. A replacement damping module could be incorporated into the modular wind turbine blade as an option. Access could be provided into the interior of the damping module in order to allow inspection or adjustment once installed; the skin/shell of the damping module 50 could be provided with a hinged access door, for example.

In the embodiment of FIG. 4, it will be noted that the vibration damping unit 60 is housed within the damping module 50. In another arrangement of damping module 50, as shown in FIG. 5, the vibration damping unit 60 is located external to the main body of the damping module 50.

Figure 5:
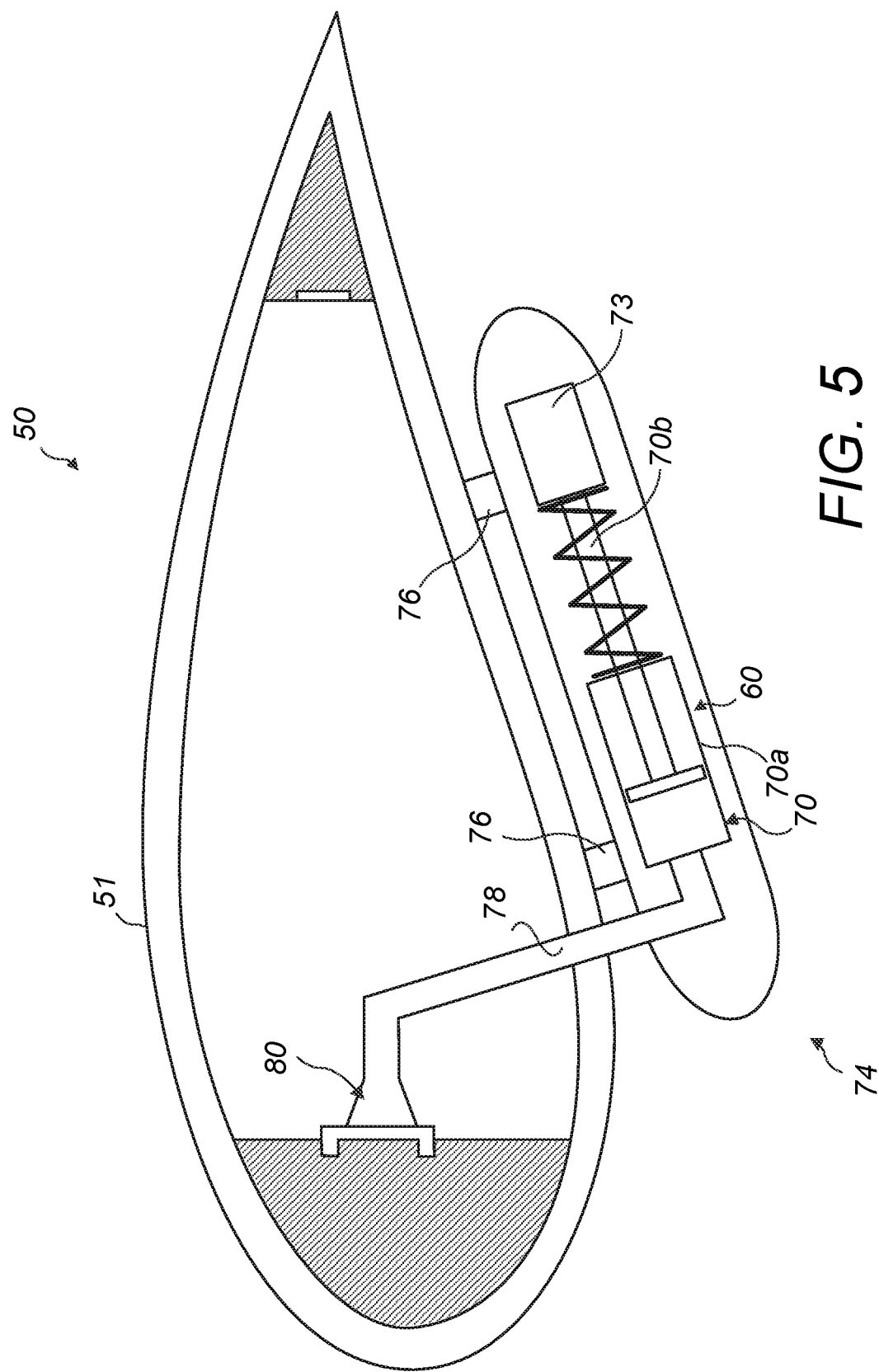
FIG. 5 is a schematic view of damping module in accordance with another embodiment of the invention.

With reference to FIG. 5, the damping module 50 includes the aerofoil body section 51 like in the previous embodiment that connects between the first blade module 24 and the second blade module 26. However, the damping module 50 also includes a nacelle or pod 74 which is elongated in form, in this embodiment. The pod 74 is connected to the body section 51 by a pair of struts 76. Other connections structures would be apparent to the skilled person. Similarly, to the embodiment of FIG. 4, the damping module 50 in FIG. 5 includes a vibration damping unit 60 which is embodied as a mass-spring-damper device 66.

However, the spring-damper device 66 includes an appropriate linkage which connects an end of the spring-damper device 66 to a component of the main body section 51 of the damping module 50. More specifically, a linkage 78 connects the barrel 70*a* of the damper unit 70 to a mounting bracket 80 at the leading edge 80 of the body section 51.

As in the previous embodiment, in the damper module 50 arrangement of FIG. 5 the vibration damping unit 60 is connected to an edge of the body section 51 of the damping module 50 and so acts to provide a force opposed to oscillatory motion of the damper module 50, thereby attenuating edgewise vibrations. Beneficially, in this embodiment since the vibration damping unit 60 is located outside of the main body section 51 of the damper module 50, it provides the opportunity to use a larger damping unit which may be useful in some circumstances. Note that in either of the previous embodiments the vibration damping unit may be connected to either the leading edge, the trailing edge, or another component of the wind turbine blade, but configured in such a way that the force applied by the vibration damping unit is directed through the shear centre of the wind turbine blade section.

In the embodiments described above, the damping module 50 has an aerofoil cross section at its interfaces which substantially matches that of the first and second damping modules 24,26 with which it is connected. It this context it will be appreciated that the aerofoil profile may not be constant along the damping module 50 in a spanwise direction because of the typical narrowing spanwise taper of a wind turbine blade. Thus, the aerofoil cross section of the damping module 50 will reduce in area gradually along its spanwise dimension. In other embodiments, the damping module 50 may have a constant aerofoil cross-section along its spanwise direction.

In other embodiments, it is not necessary for the damping module 50 to closely match the shape of the adjacent blade modules 24,26. In some embodiments, the damping module 50 may have a different shape to the adjacent blade modules. In such a case, it is not essential for the damping module 50 to have an aerofoil cross section. For example, the damping module may be in the form of an aerodynamically-shaped torpedo-like pod or nacelle.

Figure 6:
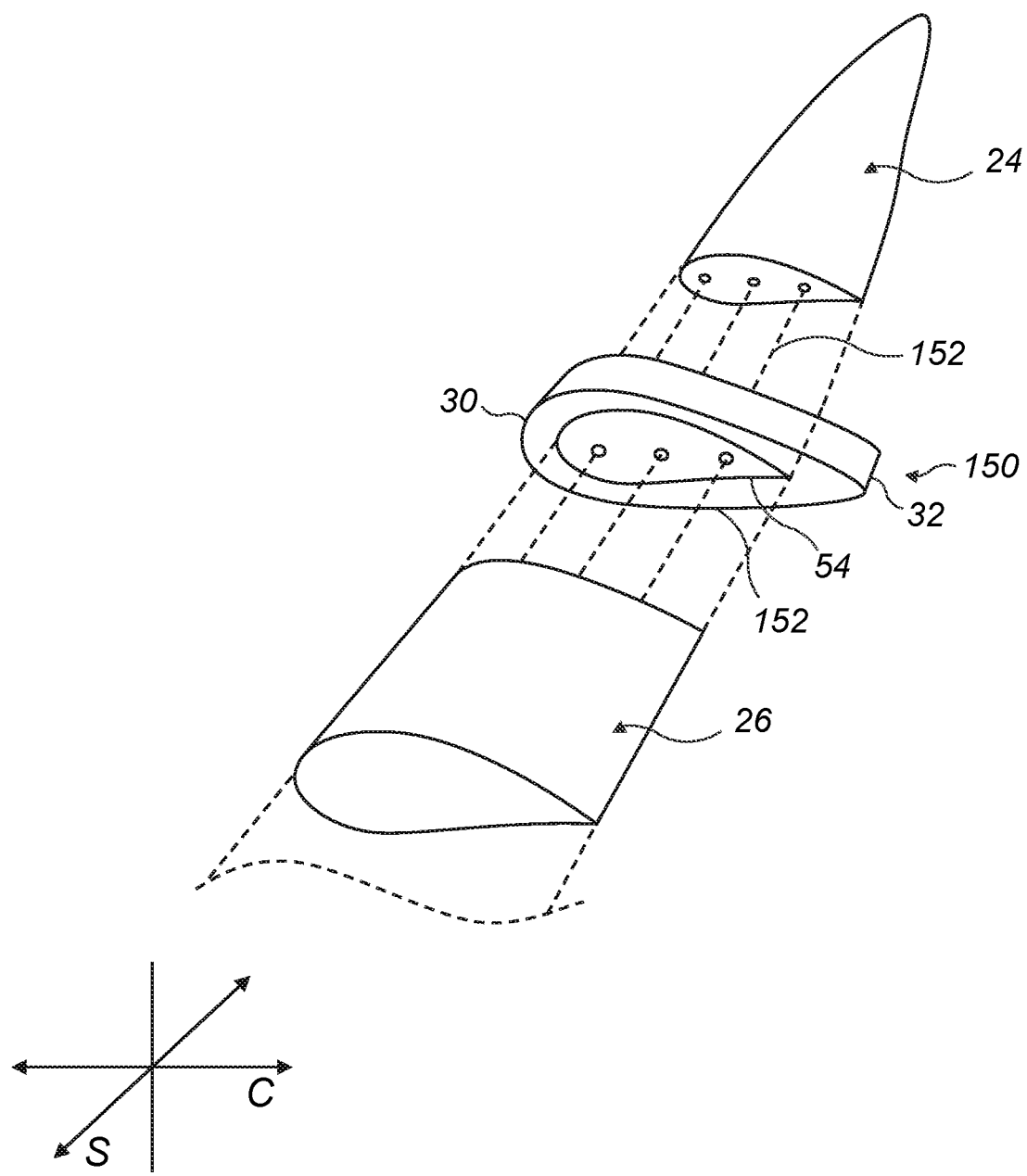
FIG. 6 is an exploded perspective view of a modular wind turbine blade in accordance with another embodiment of the invention.

Another example is shown in FIG. 6, in which parts that are shared with illustrated embodiments mentioned above will be referred to using the same reference numerals. In FIG. 6, a wind turbine blade includes first and second blade modules 24,26 and a damping module 150 that, as in previous embodiments, is sandwiched in an end-to-end manner between the blade modules 24,26.

As in the previous embodiments, the damping module 150 includes an aerofoil profile that is defined by its outer skin and which extends between leading and trailing edges 30,32. The aerofoil cross section defined by the damping module 150 on its spanwise ends may correspond to the aerofoil cross sections of the neighbouring one of the first and second blade modules 24,26. By the term 'correspond', it is meant that the aerofoil cross section has the same profile as the aerofoil cross section of the relevant blade module, but may be a scaled version of it. Expressed another way, the overall form of the aerofoil cross section may correspond, but the cross-sectional area may be larger. Alternatively, the blade module 150 may have an aerofoil cross section, albeit with an overall form that does not correspond to the aerofoil cross section of the adjoining blade modules 24,26.

As in previous embodiments, the damping module 150 of FIG. 6 includes a first interface 52 on the spanwise outer side of the damping module 150 and a second interface 54 on the spanwise inner side of the damping module 150. Note that in FIG. 6 the first interface 52 cannot be seen due to the viewing perspective of the damping module 150 but its position can be appreciated from the position of the second interface 54. In this illustrated embodiment, the connection means between the damping module 150 and the first and second blade modules 24,26 is the same as in the embodiment of FIG. 2. As such, the first interface 52 couples to the connection interface 56 of the first blade module 24, and the second interface 58 of the damping module 150 couples to the connection interface 58 of the second blade module 26.

It will be appreciated that the connection interfaces 56,58 of the blade modules 24,26 and the first and second interfaces 56,58 of the damping module 150 are planar in form and extend in a chordwise direction, in the same manner as in the FIG. 2 embodiment, and so are able to form a butt joint with one another which may be secured by way of an appropriate bolted connection as indicated by the connection lines 152.

Once the first and second blade modules 24,26 and the damping module 150 are coupled together, it will be appreciated that the outer skin of the damping module 150 will stand proud or protrude from the surrounding aerofoil surface of the blade. It should be noted that details of the form of oscillatory damping provided by the damping module 150 may be the same as that as described above with respect to FIGS. 4 and 5 so a further discussion will not be repeated here.

Figure 7A:
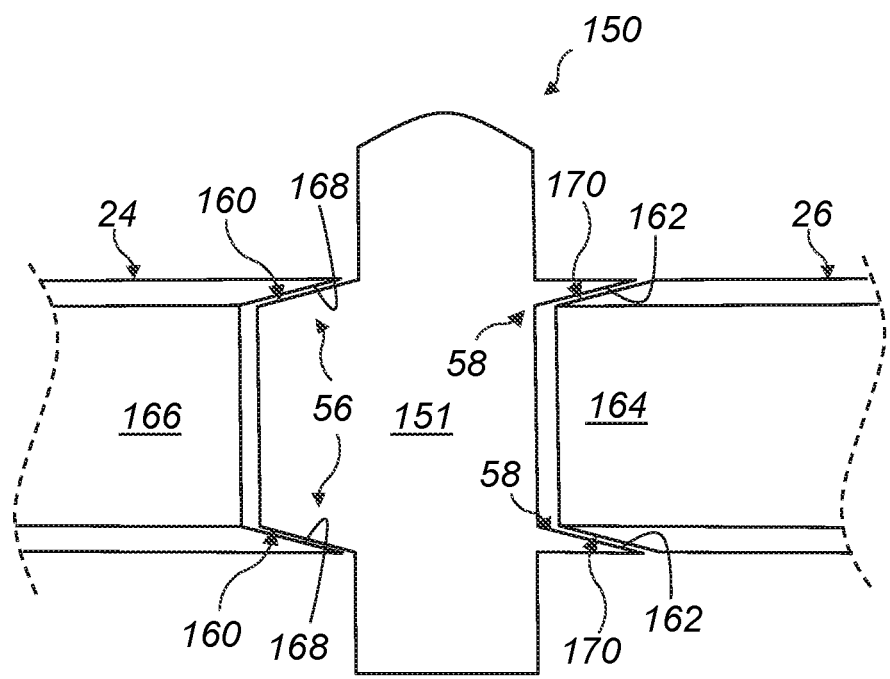
FIGS. 7a and 7b are views of connection arrangements for damping modules in accordance with embodiments of the invention.
Figure 7B:
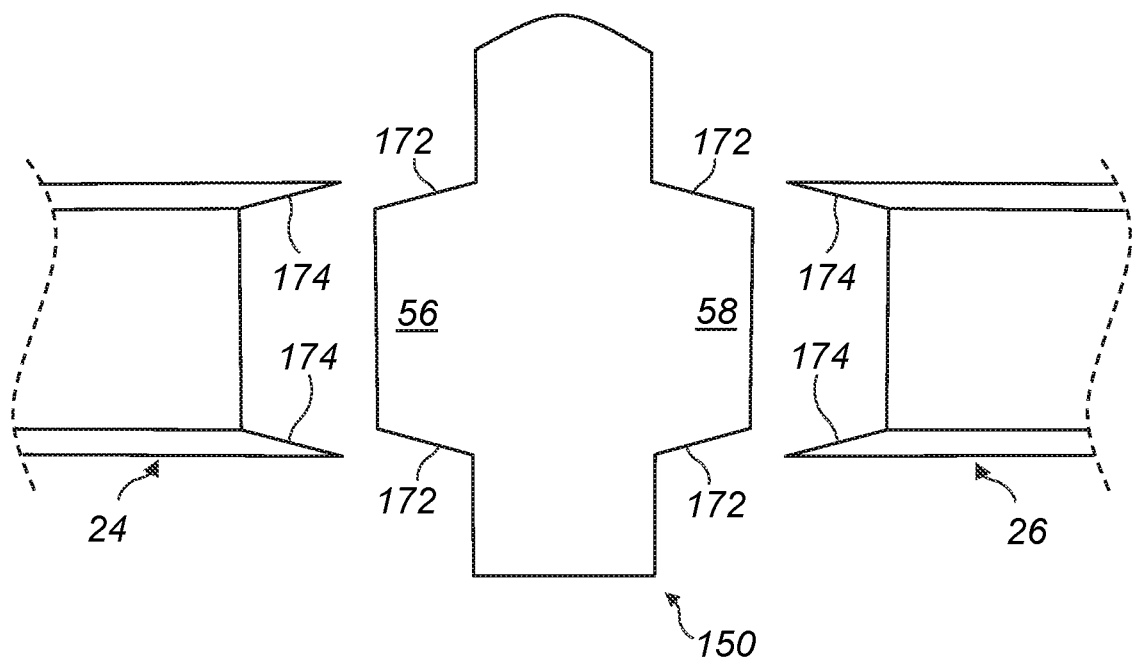

Turning now to FIGS. 7a and 7b, there are shown alternative connection schemes for the damping module 150. As shown, the damping module 150 has an enlarged outer profile like that in FIG. 6, but it should be noted that the connection schemes that are discussed here and are shown in FIGS. 7a and 7b are also applicable to the previously discussed embodiments.

As discussed above, the connection schemes that are used between the first and second blade modules 24,26 and the damping modules 50/150 in the embodiments of FIGS. 2 and 6 are based on a butt joint with a bolted connection. In other examples, however, different joints are envisaged, and different mechanical fastenings are also envisaged. Two examples are lap joints and scarf joints.

The connection schemes illustrated in FIGS. 7a and 7b are both forms of scarf joint and, more specifically, tapered scarf joints.

In FIG. 7a, the first blade module 24 can be seen on the left of the image, and the second blade module 26 can be seen on the right of the image, whilst the blade module 150 is in between the two blade modules.

In the previous embodiments, the first and second interfaces of the damping module were planar in form and extended perpendicularly to the spanwise axis of the blade, that is, in a chordwise direction. In the embodiment of FIG. 7a, however, the first and second interfaces 56,58 define a part of a scarf joint. In more detail the first interface 56 defines a protruding or 'male' counterpart of a scarf joint. As such, the first interface 56 includes two tapered surfaces 160 which extend along the spanwise axis, and so protrude away from the main body section 151 of the blade module 150.

In contrast, the second interface 58 defines a recessed or 'female' counterpart of a scarf joint. In this respect the second interface 58 is provided with two tapered surfaces 162 that taper in a direction along the spanwise axis towards the main body section 151 of the blade module 150. The tapered surfaces 162 therefore defines a form of socket for a mating portion 164 of the second blade module 26.

Returning to the first interface 56, it can be seen that the protruding tapered surfaces 160 are inserted into a complimentary-shaped socket 166 defined by the first blade module 24. The socket 166 thus comprises recessed tapered surfaces 168 that mate with the protruding surfaces 160 of the first interface 56. The mating surfaces 160,168 may be bonded with a suitable bonding agent that would securely couple the first blade module 24 to the first interface 56 of the damping module 150.

A similar arrangement is provide at the joint between the second interface 58 of the damping module and the blade interface of the second blade module 26, where the tapered surfaces of the second interface 58 of the damping module 150 mate with protruding tapered surfaces 170 of the second interface 164 of the second blade module 26. Once again, a suitable bonding agent is used to secure the mating surfaces 162,170.

FIG. 7b closely resembled the arrangement in FIG. 7a. However, it will be noted that the damping module 150 comprises first and second interfaces 56, 58 which are both defined by protruding tapered surfaces 172 which are complimentary shaped with recessed mating surfaces 174 defined by the respective blade interfaces of the first and second blade modules 24,26.

The invention claimed is:

1. A wind turbine blade having a split blade configuration, comprising:
 a first blade module defining an aerofoil profile and a second blade module defining an aerofoil profile;
 a damping module intermediate the first blade module and the second blade module,
 wherein the damping module comprises a first blade interface for joining to the first blade module and a second blade interface for joining to the second blade module, and
 wherein the damping module comprises a vibration damping unit that has a first end and a second end opposing the first end, and wherein the first end is coupled with a structural component of the wind turbine blade and the second end is a free end, and
 wherein a mounting bracket couples the first end with the structural component such that the mounting bracket and the vibration damping unit are cantilevered with respect to the structural component, and
 wherein the vibration damping unit is configured to act through a shear centre of a blade section where the vibration damping unit is located.

2. The wind turbine blade of claim 1, wherein the damping module is shaped to define an aerofoil profile.

3. The wind turbine blade of claim 2, wherein the aerofoil profile of the damping module at the first blade interface corresponds to the aerofoil profile of the first blade module.

4. The wind turbine blade of claim 3, wherein the aerofoil profile of the damping module at the first blade interface matches the adjoining aerofoil profile of the first blade module.

5. The wind turbine blade of claim 3, wherein the aerofoil profile of the damping module has a larger cross-sectional area than a cross-sectional area of the first blade module and/or the second blade module.

6. The wind turbine blade of claim 2, wherein the aerofoil profile of the damping module at the second blade interface corresponds to the adjoining aerofoil profile of the second blade module.

7. The wind turbine blade of claim 6, wherein the aerofoil profile of the damping module at the second blade interface matches the adjoining aerofoil profile of the second blade module.

8. The wind turbine blade of claim 1, wherein the vibration damping unit comprises at least one of a spring device, a damper device and a mass device to damp edgewise vibrations.

9. The wind turbine blade of claim 1, wherein the vibration damping unit is configured to act on a leading edge or a trailing edge of the damping module.

10. The wind turbine blade of claim 1, wherein at least one of the first blade interface and the second blade interface of the damping module defines a respective connection surface that extend in a chordwise direction.

11. The wind turbine blade of claim 10, wherein the respective connection surface is defined by a lateral bulkhead that extends at an angle that is within or at thirty degrees with respect to the chordwise direction.

12. The wind turbine blade of claim 10, wherein at least one of the first blade interface and the second blade interface is connected to an interface of the respective first blade module and second blade module by a bolted connection.

13. The wind turbine blade of claim 10, wherein the respective connection surface is defined by a scarf joint.

14. The wind turbine blade of claim 13, wherein at least one of the first blade interface and second blade interface is connected to an interface of the respective first blade module and second blade module by a bonded connection.

15. The wind turbine blade of claim 1, wherein the vibration damping unit includes a damper, a spring, and a mass, and wherein the spring is oriented along a chordwise direction between a barrel of the damper and the mass.

16. The wind turbine blade of claim 1, wherein the vibration damping unit includes a damper having a barrel in which a slidable piston rod is movable, and wherein the slidable piston rod is movable along a chordwise direction.

17. The wind turbine blade of claim 1, wherein the second end of the vibration damping unit is closer to a trailing edge of the wind turbine blade than the first end.

18. A wind turbine blade having a split blade configuration, comprising:
 a first blade module defining an aerofoil profile and a second blade module defining an aerofoil profile;
 a damping module intermediate the first blade module and the second blade module,
 wherein the damping module comprises a first blade interface for joining to the first blade module and a second blade interface for joining to the second blade module, and
 wherein the damping module comprises a vibration damping unit that has a first end and a second end opposing the first end, and wherein the first end is coupled with a structural component of the wind turbine blade and the second end is a free end, and
 wherein the vibration damping unit acts in a chordwise direction to attenuate edgewise vibrations of the wind turbine blade, and
 wherein the vibration damping unit is configured to act through a shear centre of a blade section where the vibration damping unit is located.

* * * * *